US008319390B2

(12) United States Patent
Snitchler et al.

(10) Patent No.: US 8,319,390 B2
(45) Date of Patent: Nov. 27, 2012

(54) GENERATOR WITH FERROMAGNETIC TEETH

(75) Inventors: Gregory L. Snitchler, Shrewsbury, MA (US); Timothy MacDonald, North Grafton, MA (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 13/164,023

(22) Filed: Jun. 20, 2011

(65) Prior Publication Data
US 2011/0248509 A1 Oct. 13, 2011

Related U.S. Application Data

(63) Continuation of application No. 12/568,742, filed on Sep. 29, 2009, now abandoned.

(51) Int. Cl.
*H02K 3/04* (2006.01)

(52) U.S. Cl. ........ 310/216.097; 310/216.111; 310/254.1

(58) Field of Classification Search ........... 310/216.069, 310/216.071–216.074, 216.097, 216.111, 310/216.112, 254.1
See application file for complete search history.

(56) References Cited

U.S. PATENT DOCUMENTS

| 3,564,312 | A | * | 2/1971 | Bunea | 310/168 |
| 4,037,123 | A | * | 7/1977 | Mole et al. | 310/52 |
| 4,058,746 | A | * | 11/1977 | Mole et al. | 310/10 |
| 4,647,802 | A | | 3/1987 | Konecny | |
| 5,587,619 | A | * | 12/1996 | Yumiyama et al. | 310/201 |
| 5,739,620 | A | | 4/1998 | Wu et al. | |
| 5,777,420 | A | | 7/1998 | Gamble et al. | |
| 6,710,496 | B2 | * | 3/2004 | Fujita et al. | 310/201 |
| 6,879,081 | B1 | | 4/2005 | Howard et al. | |
| 7,061,147 | B2 | * | 6/2006 | Ries | 310/54 |
| 7,105,973 | B2 | | 9/2006 | Brewster et al. | |
| 2004/0251759 | A1 | | 12/2004 | Hirzel | |

FOREIGN PATENT DOCUMENTS

| EP | 0690550 | 1/1996 |
| EP | 0913023 | 5/1999 |
| EP | 1325544 | 7/2003 |
| JP | 2004-187344 | 7/2004 |

OTHER PUBLICATIONS

B.B. Gamble, et al. "High-Power-Density Superconducting Generator" *J. Energy* vol. 6, No. 1, pp. 38-44 (2005).

* cited by examiner

*Primary Examiner* — Dang Le
(74) *Attorney, Agent, or Firm* — Occhiuti Rohlicek & Tsao LLP

(57) ABSTRACT

A stator assembly for use in a superconducting generator operated at frequencies up to 10 Hz is disclosed. The stator assembly includes a ferromagnetic stator winding support having a plurality of teeth defining slots, the slots configured to receive and support stator windings. The stator winding support is formed so that the ratio of the sum of the widths of the slots to the sum of the widths of the teeth and slots is in the range of 0.65 to 0.90.

20 Claims, 13 Drawing Sheets

GENERATOR WITH FERROMAGNETIC TEETH

CROSS-REFERENCE TO RELATED APPLICATIONS

This application is a continuation of U.S. application Ser. No. 12/568,742, filed on Sep. 29, 2009, the contents of which are hereby incorporated by reference.

GOVERNMENT RIGHTS STATEMENT

The U.S. Government has a paid-up license in this invention and the right in limited circumstances to require the patent owner to license others on reasonable terms as provided for by the terms of Contract No. 70 NANB7H7055 awarded by the National Institute of Standards and Technology/Advanced Technology Program.

BACKGROUND OF THE INVENTION

Power generation continues to be an important application of rotating electrical machines. Wind energy is one of the fastest growing sources of electricity in the United States and around the world, and wind turbines employing rotating electrical machines are used to convert wind energy to usable power. The generator component of a wind turbine includes the electrical generator, control electronics, and an optional gearbox for converting the low speed incoming rotation to high speed rotation suitable for generating electricity. In a wind turbine, the generator component may be approximately one third of the overall wind turbine cost.

In some conventional non-superconducting generators, stator windings are surrounded by a back iron that acts as a magnetic flux path. The back iron is often in the form of stacked laminated plates, the plates including iron teeth that extend between the stator windings to provide a flux path and to support the stator windings, which are positioned in slots formed between the teeth. In such machines, which often operate at high frequencies of 60 Hz or greater, the teeth carry the magnetic flux, and the ratio of the area of slots to the area of teeth is about 50 percent. This ratio is required in conventional machines to accommodate the magnetic flux generated in these machines. In some conventional machines, tooth area is actually increased relative to slot area as a means to reduce the cost of the machine, due to relative differences in cost between iron and copper.

Superconducting generators have been under development since the early 1960s. The use of superconducting windings in these machines has resulted in a significant increase in the magnetomotive forces generated by the windings and increased flux densities in the machines. The flux densities were increased to such an extent that there were high losses due to saturation of the iron teeth, as well as due to eddy current losses. As a result, superconducting machines have been developed to operate without iron teeth between the stator coils since the flux density would result in high dissipation in these members. In some cases, fiber-composite teeth, rather than iron teeth, are used to support stator coils in these machines. However, such fiber composite teeth are very expensive to manufacture.

SUMMARY

In some aspects, a stator assembly for use in a rotating electrical machine is provided. The stator assembly includes a stator core including a plurality of teeth defining slots, the slots configured to receive and support stator windings. The stator core is formed of a ferromagnetic material, and the ratio of the sum of the widths of the slots to the sum of the widths of the teeth and slots is in the range of 0.65 to 0.90.

The stator assembly may include one or more of the following features: The slots are elongate, radially extending openings formed in the stator core. The teeth extend radially inward and are mutually circumferentially spaced apart. The stator assembly further includes at least one stator winding disposed in a slot, and the stator winding includes a coil formed of plural bundles of conductive wires. The stator core includes an assembly of laminated plates. The ratio of the sum of the widths of the slots to the sum of the widths of the teeth and slots is in the range of 0.70 to 0.90. The ratio of the sum of the widths of the slots to the sum of the widths of the teeth and slots is in the range of 0.75 to 0.90. The stator assembly further includes a stator winding including a straight portion, wherein the straight portion is disposed in one of the slots and the straight portion is configured to substantially fully occupy the slot. The cross sectional area of the straight portion is substantially the same as the area of the slot. The stator assembly further includes a stator winding including a straight portion, wherein there are multiple stator winding straight portions disposed in each slot. The cross sectional area of the straight portion is substantially half the area of the slot, and two stator winding straight portions are disposed in each slot. The stator assembly further includes at least one stator winding, the stator winding including a cranked coil winding. The stator assembly further includes at least one stator winding including individual wire conductors arranged within the slot so that a radial conductor dimension is at least a factor of 1.5 larger than the circumferential conductor dimension. The stator assembly further includes at least one stator winding including individual wire conductors arranged within the slot so that a radial conductor dimension is at least a factor of 2 larger than the circumferential conductor dimension. The stator assembly further includes at least one stator winding including individual wire conductors arranged within the slot so that a radial conductor dimension is at least a factor of 3 larger than the circumferential conductor dimension.

In other aspects, a rotating electrical machine is provided. The rotating electrical machine includes a rotor assembly and a stator assembly. The stator assembly includes a stator core having a plurality of teeth defining slots, the slots configured to receive and support stator windings. The stator winding support is formed of a ferromagnetic material, and the ratio of the sum of the widths of the slots to the sum of the widths of the teeth and slots is in the range of 0.65 to 0.90.

The rotating electrical machine may include one or more of the following features: The rotor assembly includes a rotor having high temperature superconducting windings. The rotor and stator assemblies are configured to operate at frequencies up to 10 Hz. The rotor and stator assemblies are configured to operate at frequencies up to 3 Hz. The rotor and stator assemblies are configured to operate at a frequency of about 2 Hz. The stator core is configured to have a tooth flux density during operation that is greater than 1.8 T. The stator core is configured to have a tooth flux density during operation that is greater than 2.0 T. The stator core is configured to have a tooth flux density during operation that is greater than 2.2 T. The stator core is configured to have a tooth flux density during operation that is greater than 2.4 T. The stator core is configured to have a tooth flux density during operation that is greater than 2.6 T. The stator core is configured to have a tooth flux density during operation that is greater than 2.8 T. The machine further includes a stator winding having a straight portion, wherein the straight portion is disposed in one of the slots and the straight portion is configured to substantially fully occupy the slot. The machine further includes a stator winding having a straight portion, wherein there are multiple stator winding straight portions disposed in each slot. The machine further includes at least one stator winding having individual wire conductors arranged within the slot so that a radial conductor dimension is at least a factor of 1.5 larger than the circumferential conductor dimension. The machine further includes at least one stator winding, the stator winding including a cranked coil winding. The machine further includes an air gap between the stator assembly and the rotor assembly that is greater than 15 mm. The machine further includes an air gap between the stator assembly and the rotor assembly that is greater than 20 mm.

Superconducting electric machines are ideally suited for use in wind turbine applications as a wind-driven direct-drive generator. Due to the low frequency (10 Hz or less) output of a wind turbine, a low cost superconducting generator can be provided that includes stator winding support formed of a ferromagnetic material, without incurring the large power losses associated with high operating frequency generators. Use of a stator winding support formed of a ferromagnetic material results in a relatively low cost generator.

As will be described in greater detail below, the inventive stator assembly has features which contribute toward increasing the overall performance, as well as reducing the overall manufacturing cost of a HTS generator. In particular, the low frequency superconducting generator permits a stator support design in which the ratio of overall slot area to overall support area is greater than 60 percent. Due to the relative large slot size, the cross sectional area of the conductor within the slot is much greater than in a conventional machine, providing increased power generation.

In some embodiments, by selecting a particular stator winding configuration, a single winding is disposed in a corresponding slot. As a result, the cross sectional area of the conductor within the slot is further increased relative to other stator winding configurations, in which a single slot is occupied by leg portions of two or more stator windings, and in which insulation disposed between individual leg portions reduces overall conductor cross sectional area.

A generator includes a stator core formed of ferromagnetic laminations and including plurality of teeth provided to support stator coil windings. Use of ferromagnetic material to form the stator support reduces manufacturing costs relative to use of fiber composite materials. Although the ferromagnetic teeth of the stator support become highly saturated, the generator is operated at relatively low frequency, whereby the power losses associated with higher frequency machines due to teeth saturation, as well as due to copper and heat generation, are minimized.

The superconducting synchronous generator can be shown to produce stator tooth flux densities that are greater than 2.8 Tesla at generator operating frequencies of 10 Hz or less. In addition, employing an air gap greater than 15 to 20 mm between the stator and rotor assemblies in these machines further reduces losses.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

Figure 1:
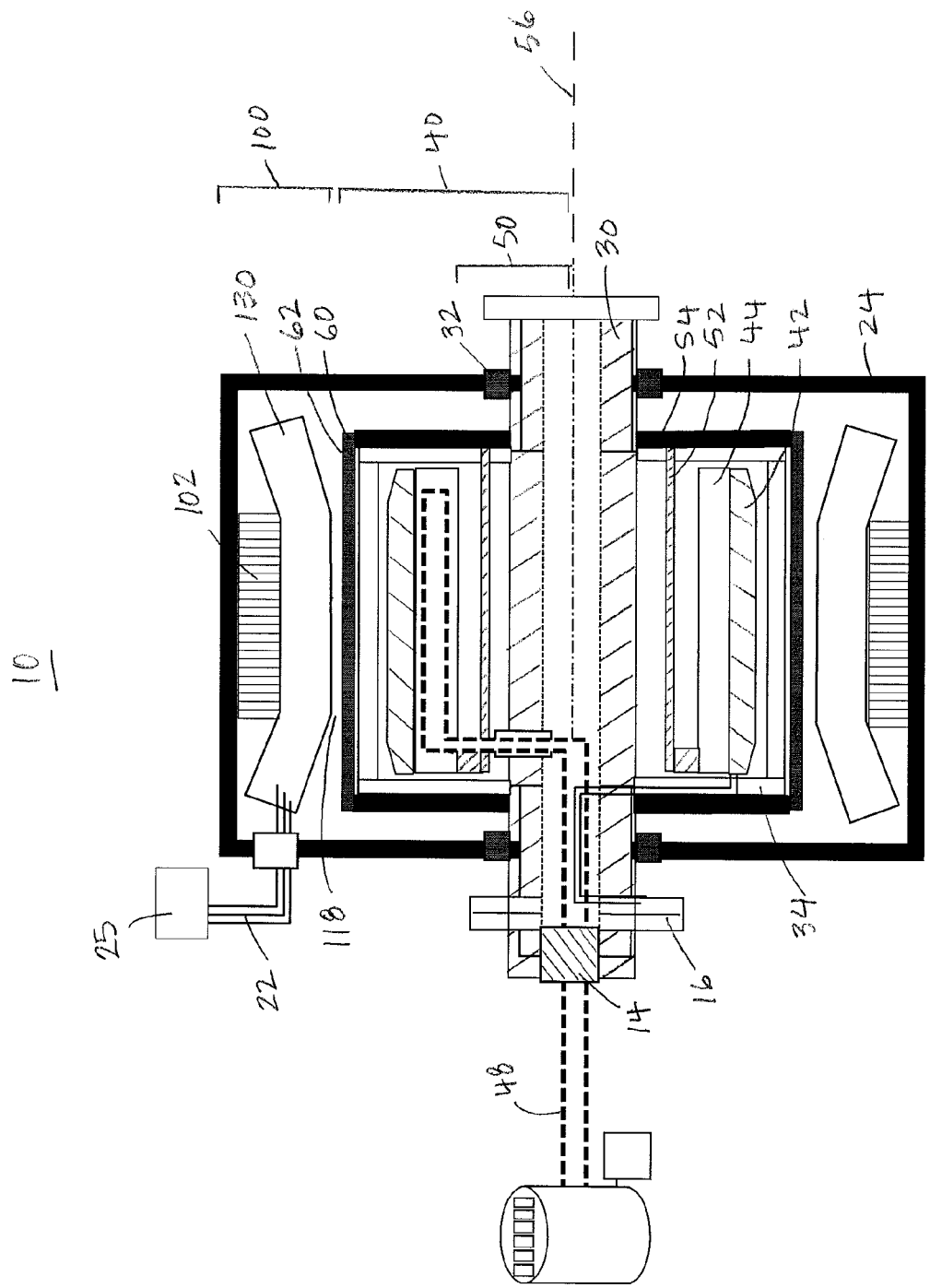
FIG. 1 is a schematic side sectional view of a generator.

Referring now to FIG. 1, generator 10 is a rotating superconducting machine that includes a rotor assembly 40 mounted within a stator assembly 100. As will be described in greater detail below, the generator 10 is configured for use in low frequency applications of 10 Hz or less. For example, when generator 10 is used as a generator in a wind turbine, the rotor and stator assemblies 40, 100 are configured to operate at about 2 Hz.

The rotor assembly 40 includes rotor windings 42 formed of a high-temperature superconductor (HTS), a torque transfer system 50, and an electromagnetic shield 60. The rotor windings 42 are supported by a rotor winding support structure 44 within a cryostat 34. Although other configurations are possible, the rotor windings 42 of this embodiment include several HTS sub-coils formed in a racetrack configuration. U.S. Pat. No. 6,509,819, the entire contents of which are incorporated herein by reference, discusses exemplary rotor coil configurations in more detail. The torque transfer system 50 transfers the rotational forces generated by the rotor assembly to an output shaft 30, and is also disposed in the cryostat 34. The system 50 includes a torque tube 52 connected at one end to the rotor winding support structure 44, and at the other end to the output shaft 30 via an end plate 54. The electromagnetic shield 60 surrounds the cryostat 34 and consists of a conductive, non-magnetic material that shields rotor windings by attenuating asynchronous fields produced by the stator currents. In addition, the electromagnetic shield 60 shields the cryostat from heat generated in the stator assembly.

The generator 10 also includes a brushless exciter 16 to provide the current to the rotor windings 42. The exciter 16 consists of a transformer and associated electronics (not shown) to condition and control the power for the rotor windings 42. The rotor windings 42 are conduction cooled through the rotor support structure 44 using gaseous helium, which circulates inside the cryostat 34 to cool the HTS rotor windings 42. The coolant supply lines 48 that permit inward and outward flow of the gaseous helium to the rotor assembly 40 pass through the coaxial helium transfer coupling 14, which is a stationary-to-rotating union. Bearings 32 are mounted in a frame 24 to support opposed ends of the output shaft 30, whereby the rotor assembly 40 is rotatably and coaxially supported within the stator assembly 100.

Figure 2:
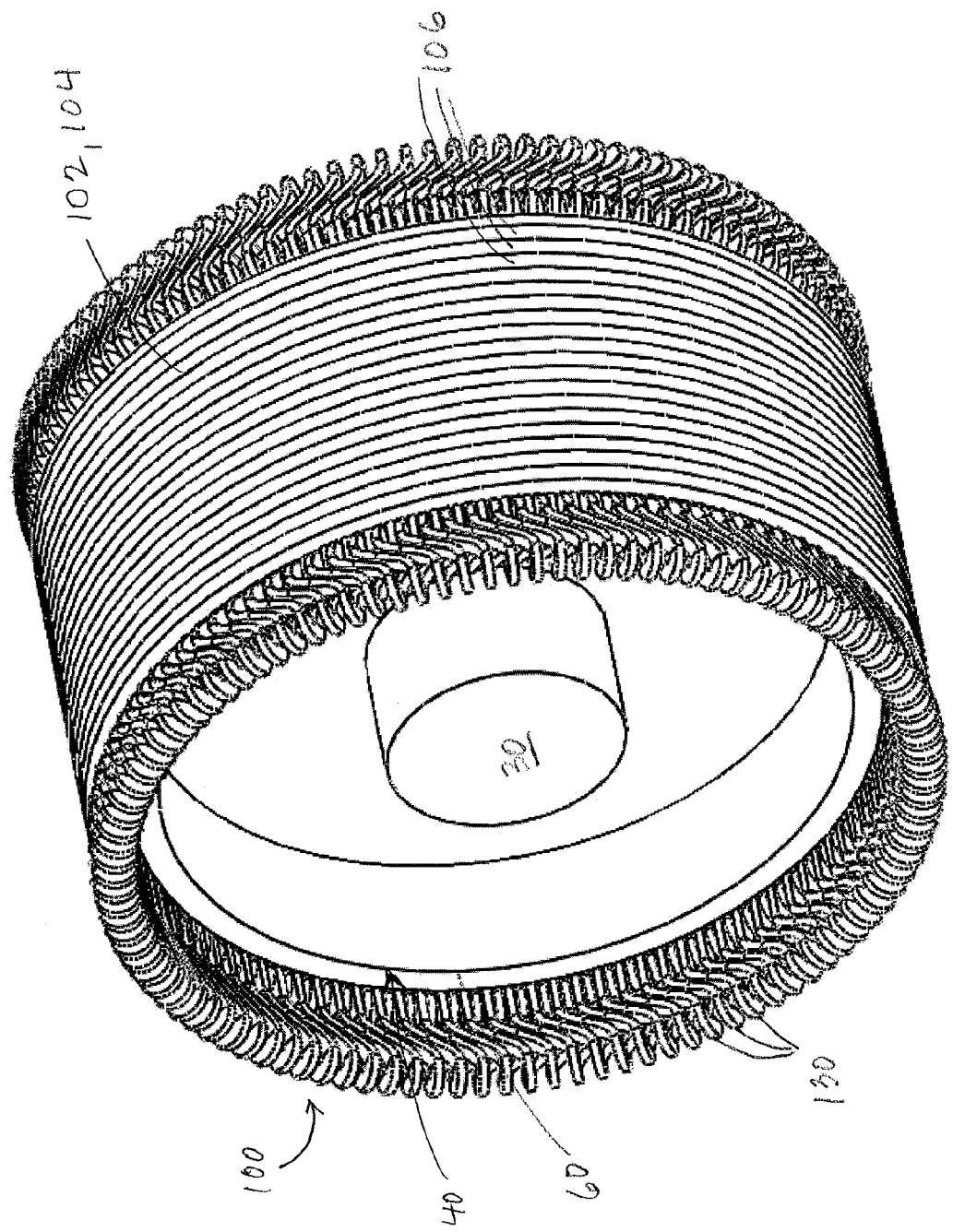
FIG. 2 is an end perspective view of the stator and rotor assemblies of the generator of FIG. 1.

Referring to FIG. 2, the stator assembly 100 includes a stator core 102 and stator windings 130. The stator core 102 is a hollow cylindrical body 104 that is an assembly of stacked laminated ferromagnetic plates 106. To form the stator core 102, the ferromagnetic plates 106 are punched to provide the desired toothed shape, and the plates 106 are stacked to form the hollow cylindrical body 104 and fixed by conventional means such as epoxy.

Figure 3:
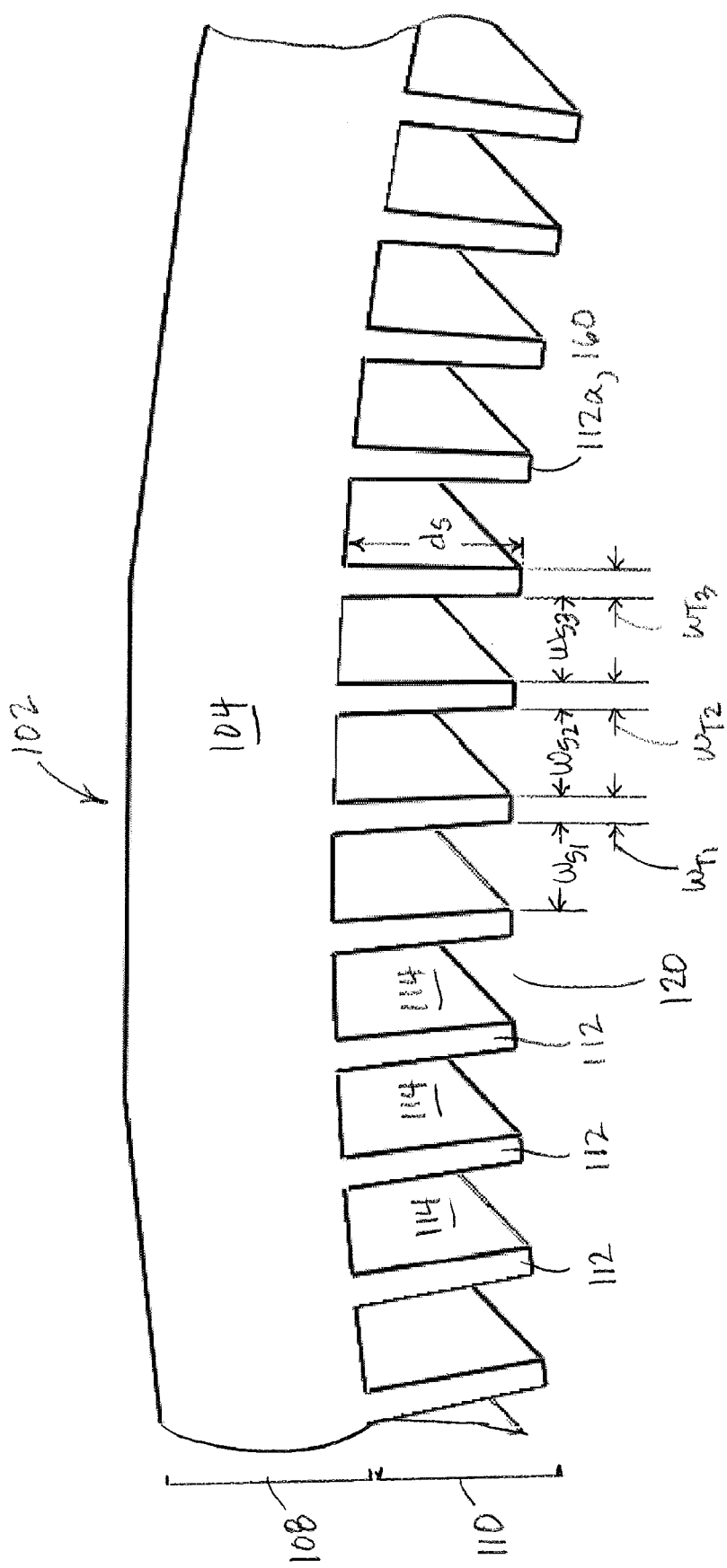
FIG. 3 is an partial sectional view of the stator core of the generator of FIG. 1 without stator windings.

Referring also to FIG. 3, the stator core 102 includes a back iron area 108 adjacent to and including the outer diameter of the stator core 102, and multiple stator teeth 112 extend radially inward from the back iron area 108 to form slots 114. Each tooth 112 has a tooth width $w_T$, and all teeth 112 have approximately the same tooth width $w_T$. The number of teeth 112 provided depends in part on the configuration of the stator winding 130 to be supported in the stator core 102. In the illustrated embodiment of generator 10, the stator core 102 is provided with 216 stator teeth 112.

As viewed in cross section, the stator teeth 112 are regularly and mutually circumferentially spaced apart, the spacing between adjacent teeth 112 defining a stator slot 114. The stator slots 114 are rectangular in shape and have a slot width $w_S$ corresponding to the (circumferential) distance between adjacent teeth 112. In this embodiment, the rectangular shape of the stator slot 114 reflects the rectangular peripheral shape of the straight portion of the stator winding 130 to be received in the slot 114. The radially innermost edges 112a of the teeth 112 jointly define the cylindrical rotor assembly-receiving bore 116 of the stator core 102. Slot openings 120 are defined between each pair of adjacent teeth 112, through which stator windings 130 are inserted into the slot.

The rotor assembly 40 is supported within the bore 116 so that the rotor and stator assemblies 40, 100 are coaxial. With this arrangement, an air gap 118 is provided between an inner surface of the stator core 102 (e.g., bore surface 116) and an outer surface 62 of the electromagnetic shield 60.

In the illustrated embodiment of generator 10, the stator assembly includes 108 stator windings 130 arranged in a three or nine phase configuration. For a three phase configuration, 36 stator windings 130 per phase are provided, resulting in a 24-pole arrangement.

Figure 4:
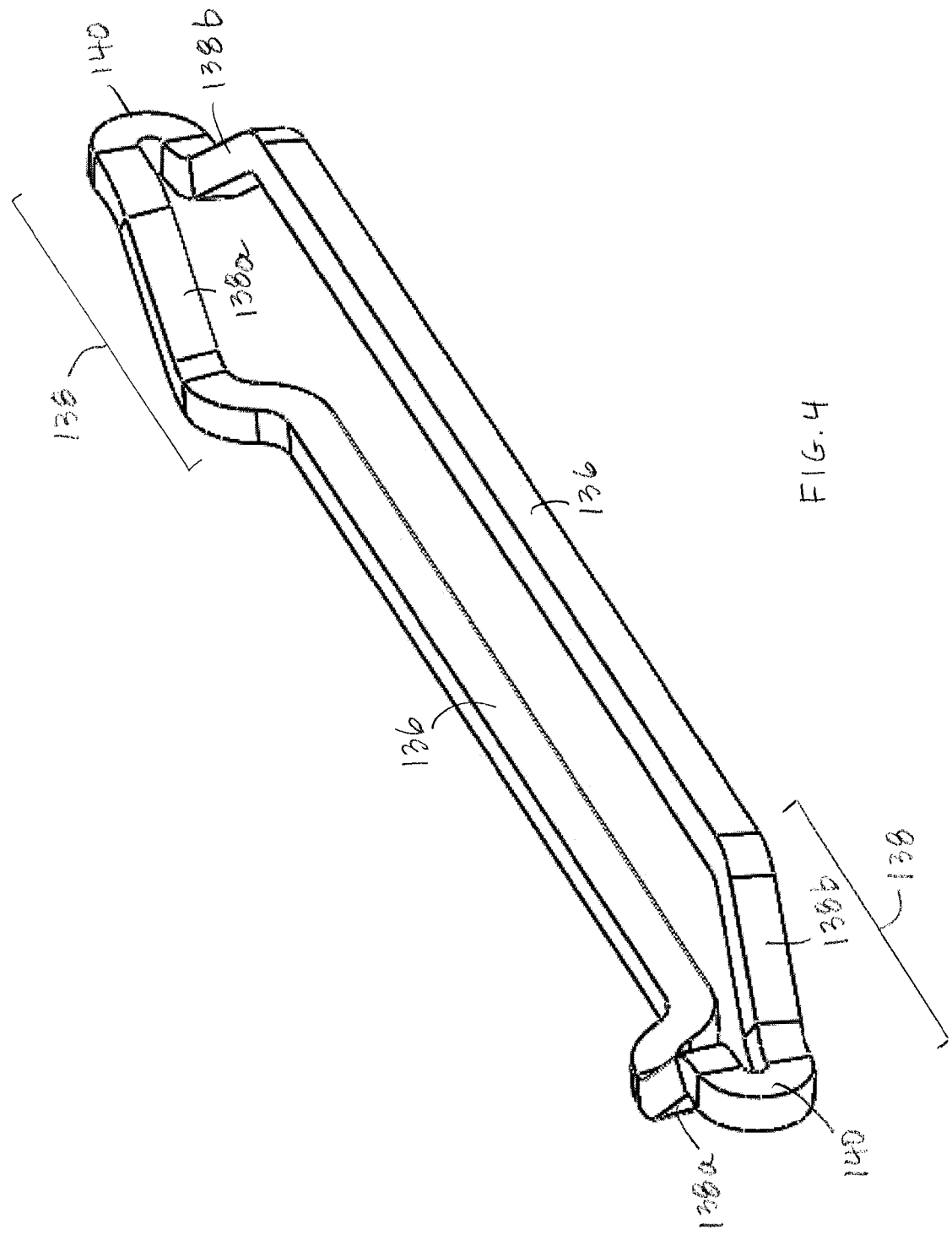
FIG. 4 is perspective view of a cranked stator winding where each side occupies a complete slot.
Figure 5:
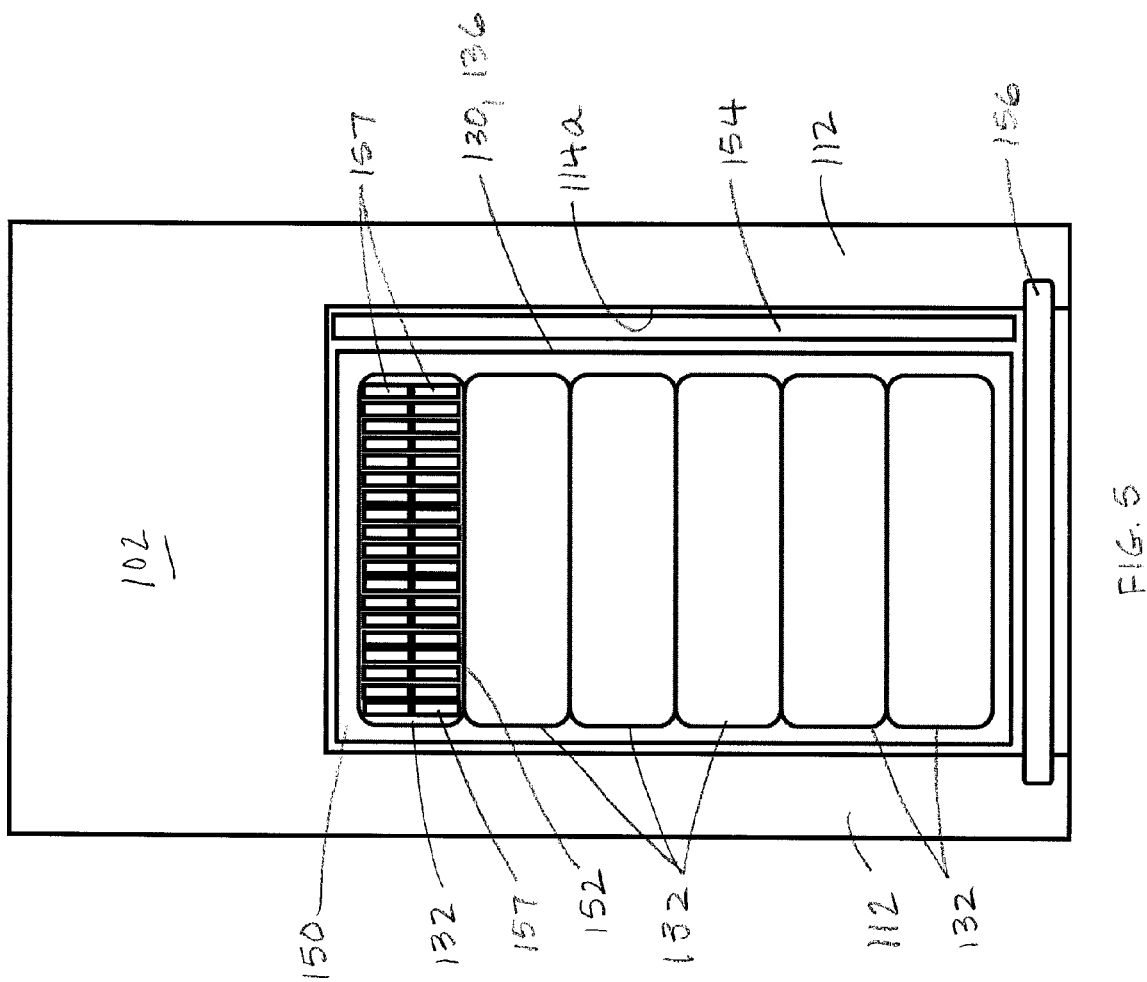
FIG. 5 is a partial sectional view of the stator core of the generator of FIG. 1 with cranked stator windings disposed in the slots.
Figure 6:
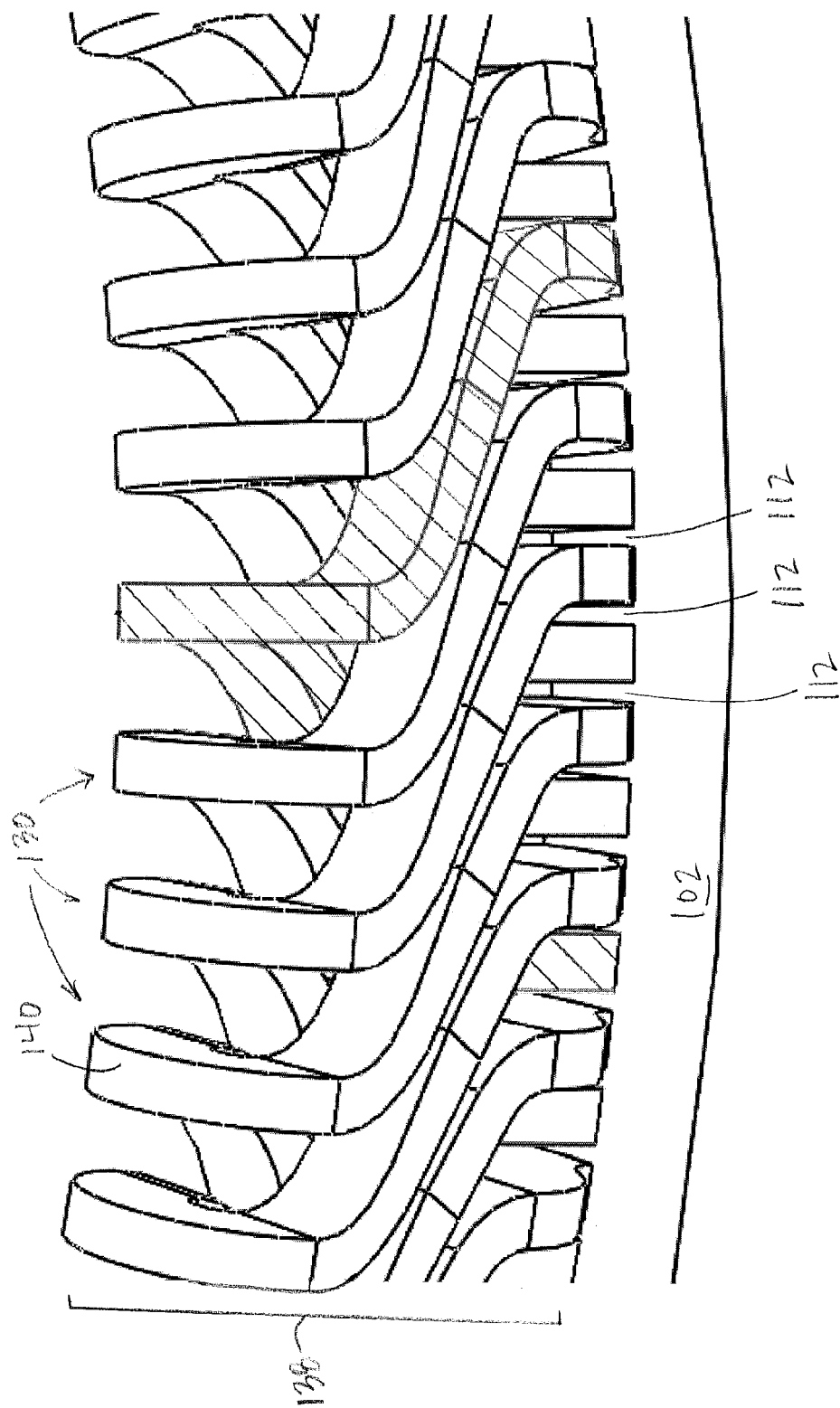
FIG. 6 is perspective view of the end turns of the cranked stator windings within the stator core.

Referring to FIGS. 4-6, the stator windings 130 are formed of transposed wire cables 132, in which the individual copper wire conductors (157) are twisted and/or woven to form a pattern which reduces eddy current losses. The transposed cables 132 may include Litz wire, Rutherford wire, Robel wire, or any other suitable transposed wire. The effect of transposition can also be achieved by the use of end transpositions between wires or selecting designs that use single wires in series for each coil and operated in parallel at the end coil connections.

If the conductors 157 are rectangular in cross section, the conductor radially-directed dimension (ie, the dimension aligned with the slot depth $d_S$) is longer than its circumferential dimension (ie, the dimension aligned with the slot width $w_S$) in order to lower the eddy current losses. A typical conductor 157 has a radial dimension to circumferential dimension aspect ratio in a range of 1.5:1 to 5:1. It should be noted that the aspect ratio described here is opposite of what is typical in conventional machines where the eddy current losses are dominated by cross-slot leakage in which magnetic flux lines jump between two adjacent teeth. Multistrand Litz wires typically have a 1:1 aspect ratio.

The transposed cables 132 have an outer insulative sheath, whereby insulation layer 152 is provided between turns, and the outer periphery of the stator winding 130 includes a layer of ground insulation 150.

The transposed cables 132 are wound around an axis transverse to the longitudinal axis of the stator assembly 100 to form an elongated multi-turn winding 130 including a parallel pair of straight portions 136 connected by end turn portions 138. In this case, the stator winding 130 is a cranked winding (FIG. 4) in which the straight portions 136 are linear elongated members that extend in parallel. The end turn portions 138 include a U-shaped turn 140 that lies in a plane transverse to the plane in which the straight portions 136 lie. As a result, one end winding leg portion 138a is located radially outward of the plane, and the return leg end winding portion 138b is located in the plane. The particular shape of the end portion 138 permits the stator windings 130 to extend between respective slots 114 and to accommodate the presence of the respective end portions 138 of the other stator windings 130 (FIG. 6).

The straight portion 136 of the stator winding 130 is inserted into the slot 114 through the slot opening 120, and a slot wedge 156 is used to retain the stator winding 130 within the slot 114. In some embodiments, an insulative slot liner 154 is positioned in the slot 114 between the stator winding 130 and one side wall 114a of the slot 114. In this configuration, the slot liner 154 serves as packing within the slot to ensure even loading. Alternatively, a slot liner 154' (not shown) may be configured to surround the stator winding 130 on three sides, insulating the winding 130 from all slot walls. Use of a cranked winding 130 is advantageous since the rectangular cross section of the straight portions 136 are well suited for use in the relatively wide slots 114 provided in the stator core 102. In particular, the cross-sectional area of the straight portion 136 is substantially the same as the slot area $A_S$, where slot area $A_S$ is defined as slot width $w_S$ multiplied by slot depth $d_S$ (FIG. 3), and the cranked stator winding 130 substantially fully occupies the slot 114 (FIG. 5).

Referring again to FIG. 1, the stator windings 130 are electrically connected to an external power converter 25 via power supply lines 22, and when torque is applied to the rotor causing rotation of the output shaft 30, alternating magnetic flux is produced which extends through the air gap 118 from the HTS rotor windings 42 and interacts with the stator 130 to generate power.

The stator windings 130 are cooled by conventional means. For example, in some embodiments, the stator windings 130 may be conduction cooled. In this example, the straight portions 136 can be conduction cooled through the back-iron 108, and the heat can be extracted by air flow or a liquid cooling jacket (not shown) on the outer diameter of the stator core 102. The end turns 138 can be cooled by forced convection. In other embodiments, the stator windings 130 may be air cooled. For example, lamination spacing (not shown) can be fabricated into the stator core 102, and air can be ventilated from the inner diameter to the outer diameter of the stator core 102 with forced convection. The end turns 138 can also be cooled by forced convection. In other embodiments, the stator windings 130 can be cooled by direct liquid cooling. For example, the stator windings 130 can be cooled by direct contact with a dielectric fluid with the addition of narrow cooling passages (not shown) within the stator slot area. In still other embodiments, the stator windings 130 can be fabricated with internal tubes built into windings, and deionized water can be circulated in the tubes to provide direct cooling. In still other embodiments, the stator windings 130 can be fabricated with external water cooling tubes, specifically, having tubes built outside the ground insulation of the windings. Deionized or fresh water can be circulated in the tubes to provide stator winding cooling. In this case, copper fins can be potted with the tubes to improve cooling on the outside surface of the ground plan insulation.

Referring again to FIG. 3, the stator core 102 is formed so that the overall tooth width $w_T$ is small relative to the overall slot width $w_S$. In particular, the ratio of the sum of the widths of the slots to the sum of the widths of the teeth and slots is in the range of 0.65 to 0.90, where the sum of the widths of the slots is defined as $$\text{Sum}_{wS} = \Sigma w_{S1} + w_{S2} + w_{S3} + \ldots + w_{SN},$$

the sum of the widths of the teeth and slots is defined as $$\text{Sum}_{wS+wT} = w_{S1} + w_{S2} w_{S3} + \ldots + w_{SN} + w_{T1} + w_{T2} + w_{T3} + \ldots + w_{TN}, \text{ and}$$

N is the number of slots in the stator core 102. In the illustrated embodiment, N=216, but the stator core 102 is not limited to this number of slots.

In other embodiments, the ratio of the sum of the widths of the slots to the sum of the widths of the teeth and slots is in the range of 0.70 to 0.90. In still other embodiments, the ratio of the sum of the widths of the slots to the sum of the widths of the teeth and slots is in the range of 0.75 to 0.90.

In some embodiments of the generator 10, the slot width $w_S$ may be at least twice as large as the tooth width $w_T$, and the main function of the teeth in this device is to provide support for the stator windings 130. A stator core formed having a ratio of the sum of the widths of the slots to the sum of the widths of the teeth and slots as disclosed here is novel since in high frequency machines such slot to tooth proportions are associated with high losses and associated limits in power output. In contrast, in the generator 10, the relatively large slot area permits use of additional conductor within the slot, which is advantageous since power losses decrease with increased conductor area particularly when the conductor is subdivided and effectively transposed. Also advantageously, although the stator teeth 114 of generator 10 mainly serve to support the stator windings 130, use of the ferromagnetic material therein also results in a modest increase (about 10 percent) in air gap flux.

In addition, because the generator 10 is operated at low frequencies (up to 10 Hz), the eddy current losses associated with ferromagnetic teeth and the copper conductors in the slots are reduced.

Further advantageously, use of a ferromagnetic material to form the stator teeth 114 permits the generator 10 to be inexpensively manufactured.

Figure 7:
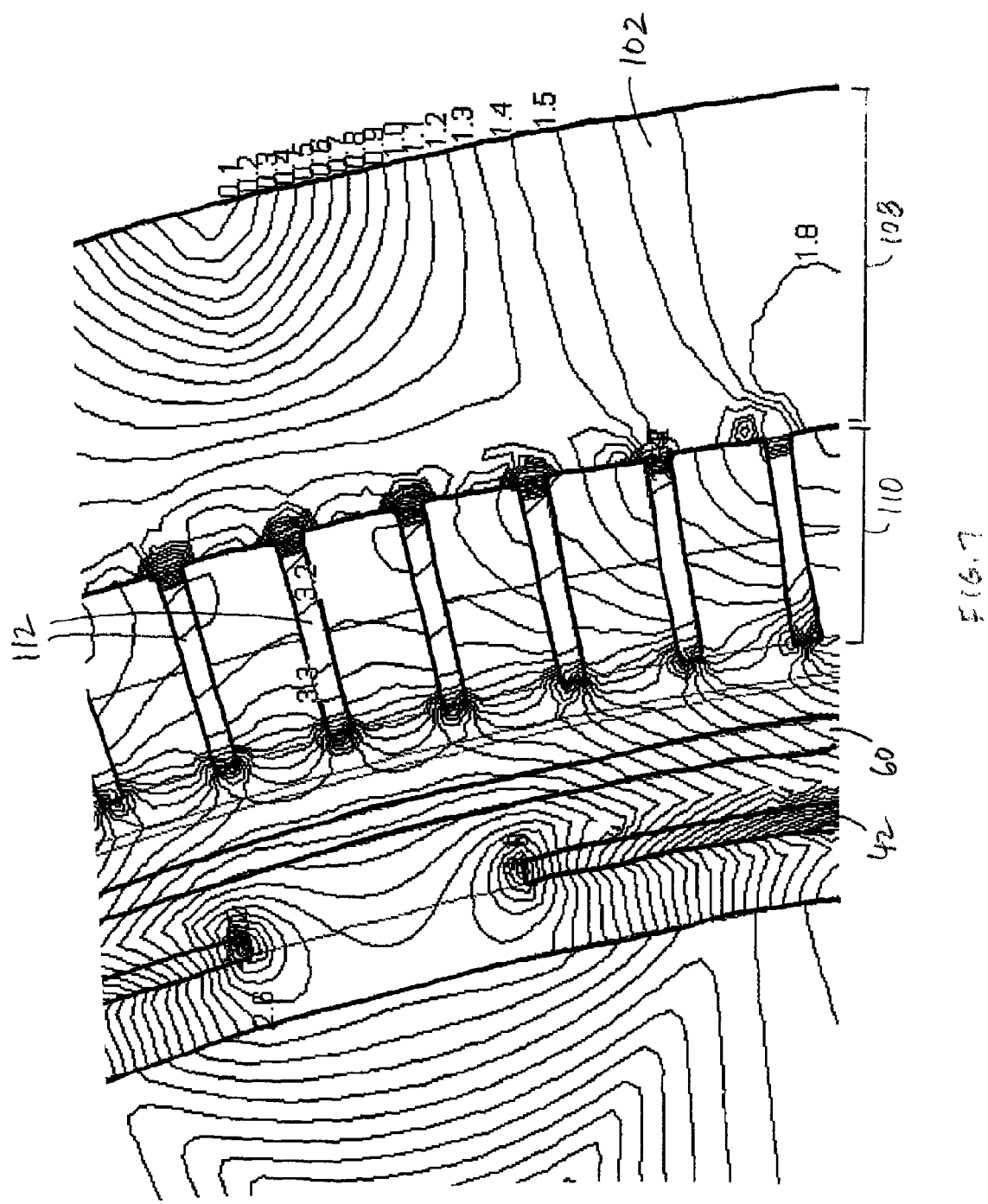
FIG. 7 is an open circuit magnetic flux profile for the generator of FIG. 1.

When generator 10 is operated at a low frequency, for example about 2 Hz, the tooth flux density is greater than 1.8 Tesla. As seen in FIG. 7, which illustrates calculated flux density over a portion the stator and rotor assemblies the tooth flux density is shown to be greater than 3.0 Tesla. Thus, the generator 10 is configured to operate with flux saturated teeth, and during operation, teeth 114 of generator 10 are at a much higher flux density than in conventional superconducting generators, which generally operate with teeth having a flux density of less than 1.8 Tesla. However, due to the low frequency operation of generator 10, although the teeth 114 are saturated, the resulting losses (as scaled from ARMCO tables) are less than 10 kW.

Figure 8:
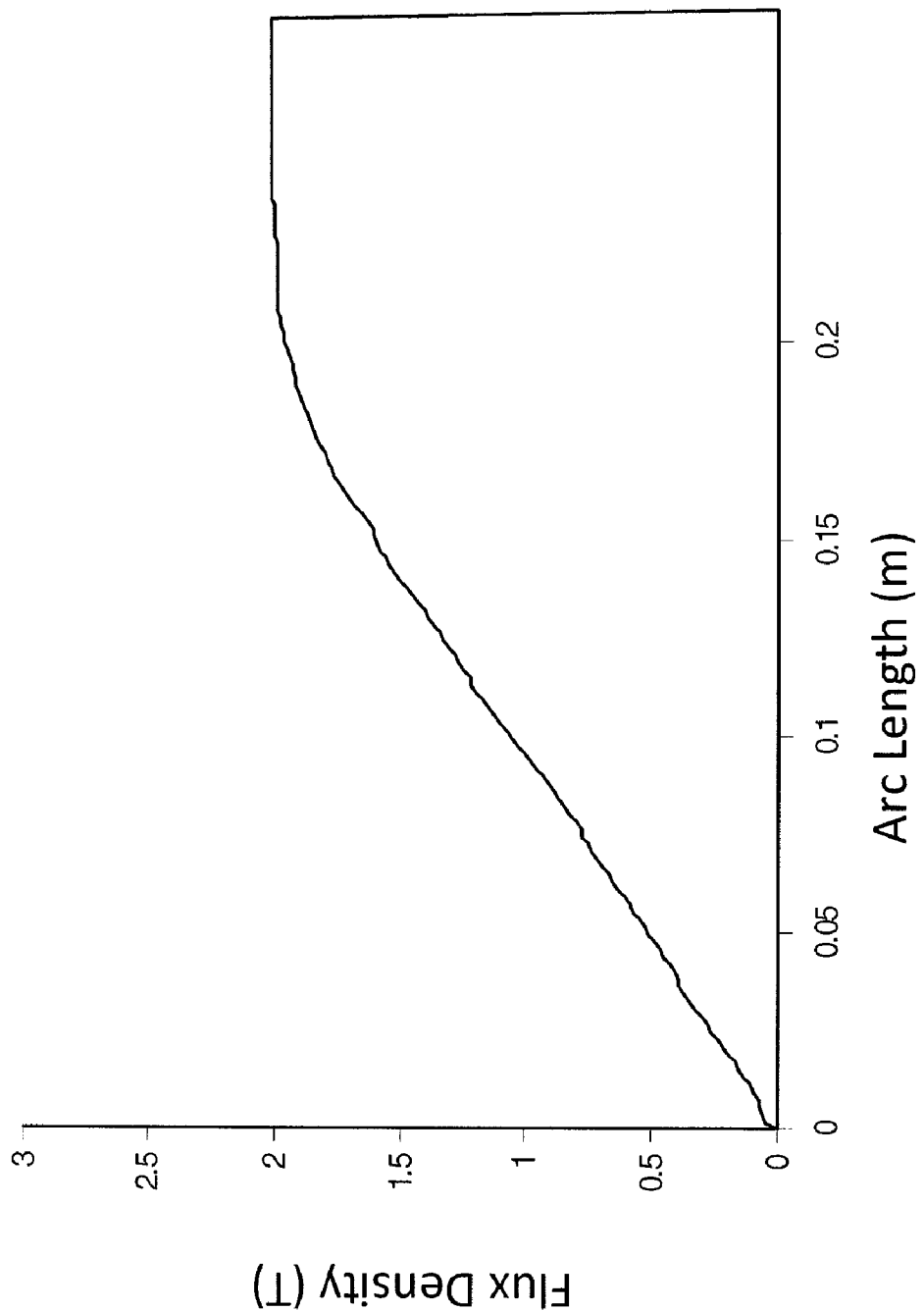
FIG. 8 is a graph of arc length (meters) versus flux density (Tesla), representing air gap flux density in a generator having non-ferromagnetic teeth and a slot area to support area ratio greater than 0.60.

Referring now to FIG. 8, the flux density in the air gap, as measured at the surface 62 of the electromagnetic shield 60, is shown for a superconducting generator that includes a stator core formed with non-ferromagnetic teeth (ie, composite or stainless steel) but including a stator core in which ratio of the sum of the widths of the slots to the sum of the widths of the teeth and slots is in the range of 0.65 to 0.90. This graph shows a flux density that is greater than 1 Tesla in the air gap. This flux density is greater than in some conventional machines, which have an air gap flux density of about 1 Tesla. This graph illustrates that more power is produced in the air gap relative to a conventional machine due to the use of HTS rotor coils, and further illustrates that the inventive stator construction, including a ratio of the sum of the widths of the slots to the sum of the widths of the teeth and slots in the range of 0.65 to 0.90, does not prevent adequate power production.

Figure 9:
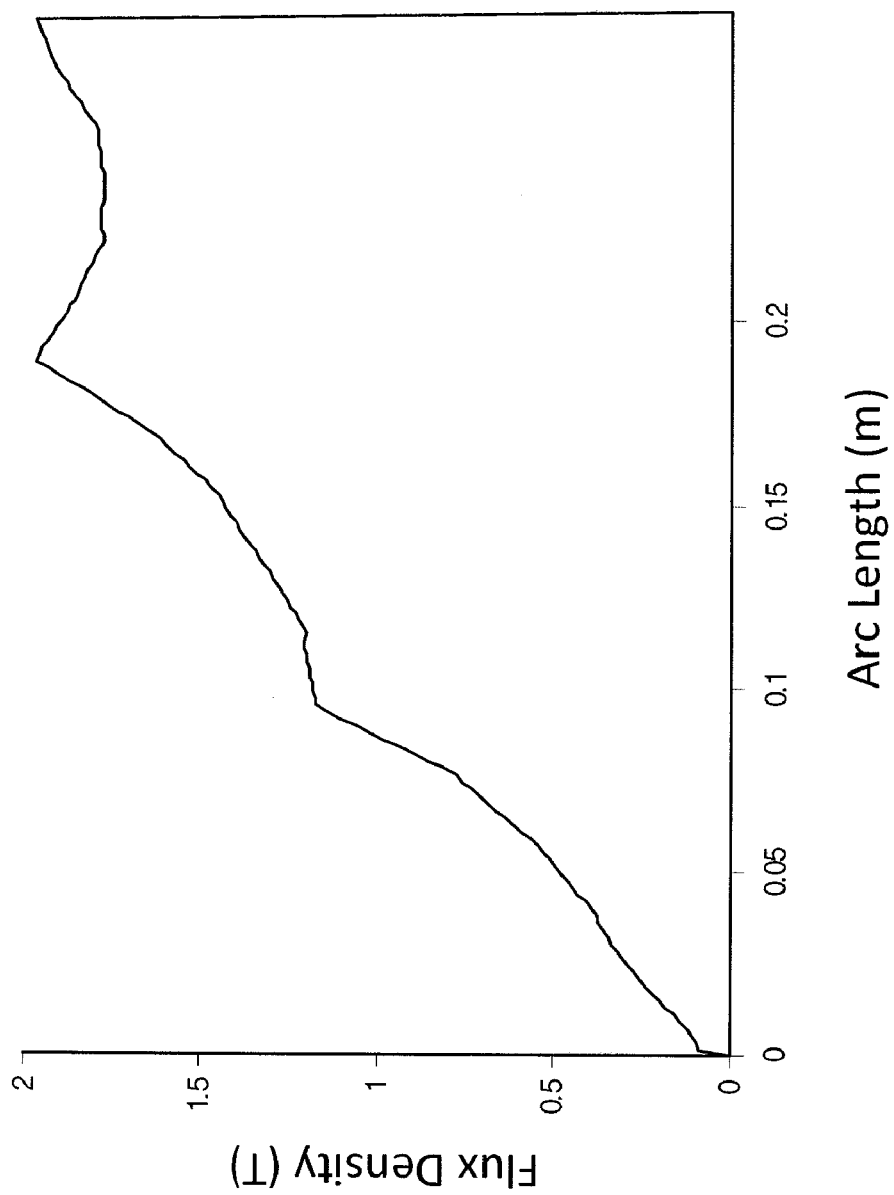
FIG. 9 is a graph of arc length (meters) versus flux density (Tesla), representing air gap flux density in a generator having ferromagnetic teeth and a slot area to support area ratio greater than 0.60.
Figure 10:
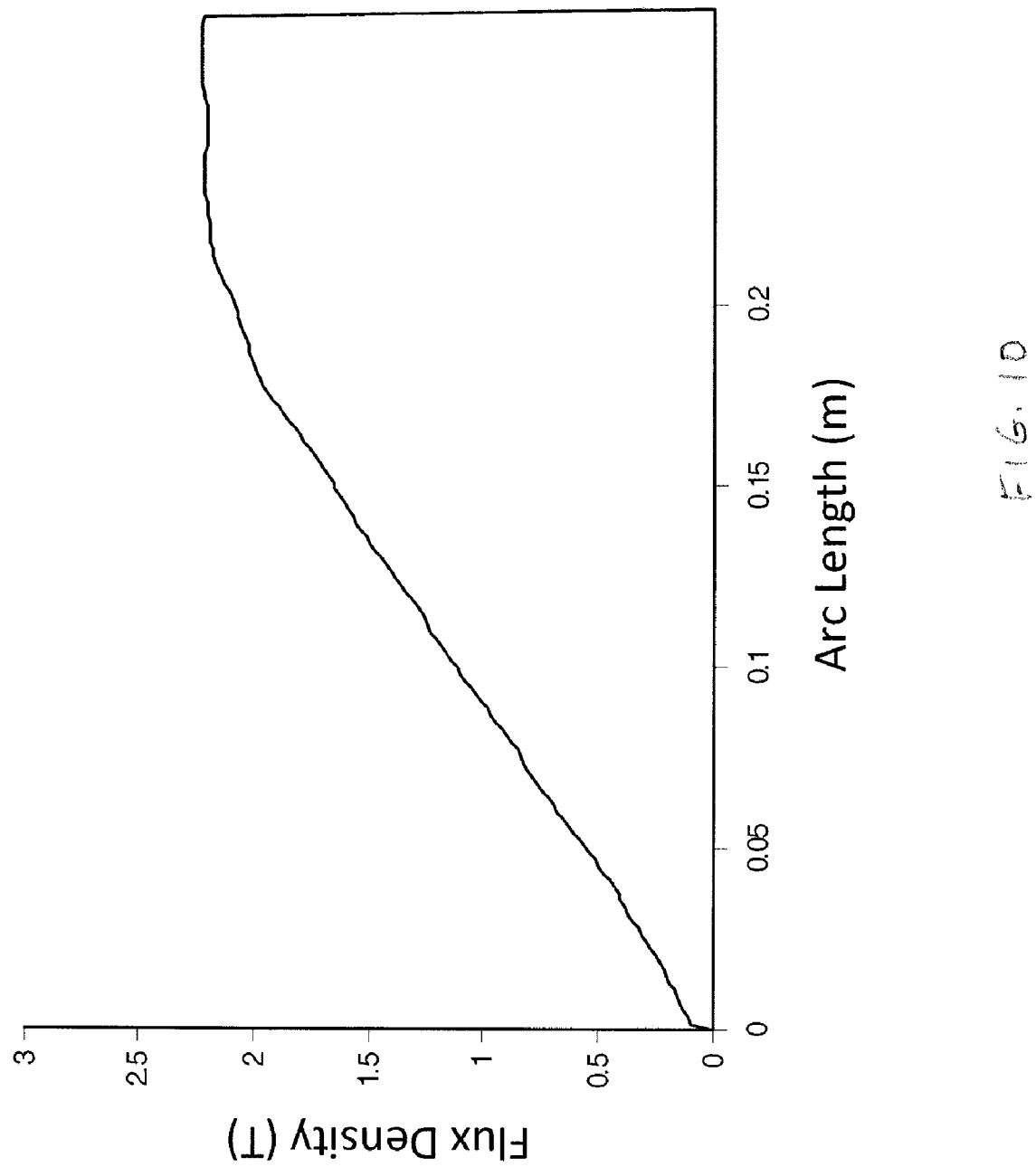
FIG. 10 is a graph of arc length (meters) versus flux density (Tesla), representing air gap flux density in a generator having ferromagnetic teeth, a slot area to support area ratio greater than 0.60, and an air gap of greater than 15 mm.

There are limitations to the use of ferromagnetic saturated teeth. For example, the electromagnetic shield 60 can have additional losses due the field changes associated with tooth passing. Referring now to FIG. 9, the flux density in the air gap, as measured at the surface 62 of the electromagnetic shield 60, is shown for a superconducting generator that includes a stator core formed with ferromagnetic teeth and including a stator core in which the ratio of the sum of the widths of the slots to the sum of the widths of the teeth and slots is in the range of 0.65 to 0.90. This graph shows a flux density that includes some harmonic content as represented by localized peaks at about 0.09 m and 0.18 m. Such harmonic content is undesirable since it results in heating on the electromagnetic shield 60, and thus power loss in the rotor assembly 40. However, as seen in FIG. 10, such harmonic content can be avoided by increasing the air gap 118. For example, in some embodiments, generator 10 can include an air gap of greater than 15 mm. In other embodiments, generator 10 can include an air gap of greater than 20 mm. For purposes of comparison, in a conventional generator of comparable size, an air gap of 5 to 10 mm is often used. Thus, a relatively large air gap 118 is beneficial for use in a low speed system as embodied by generator 10.

The generator 10 has been described here as employing cranked stator windings 130. However, the generator 10 is not limited to use of the cranked stator winding 130, and it is well within the scope of the invention to use windings of other configurations, such as, but not limited to, diamond windings 230 or single layer windings 330.

Figure 11:
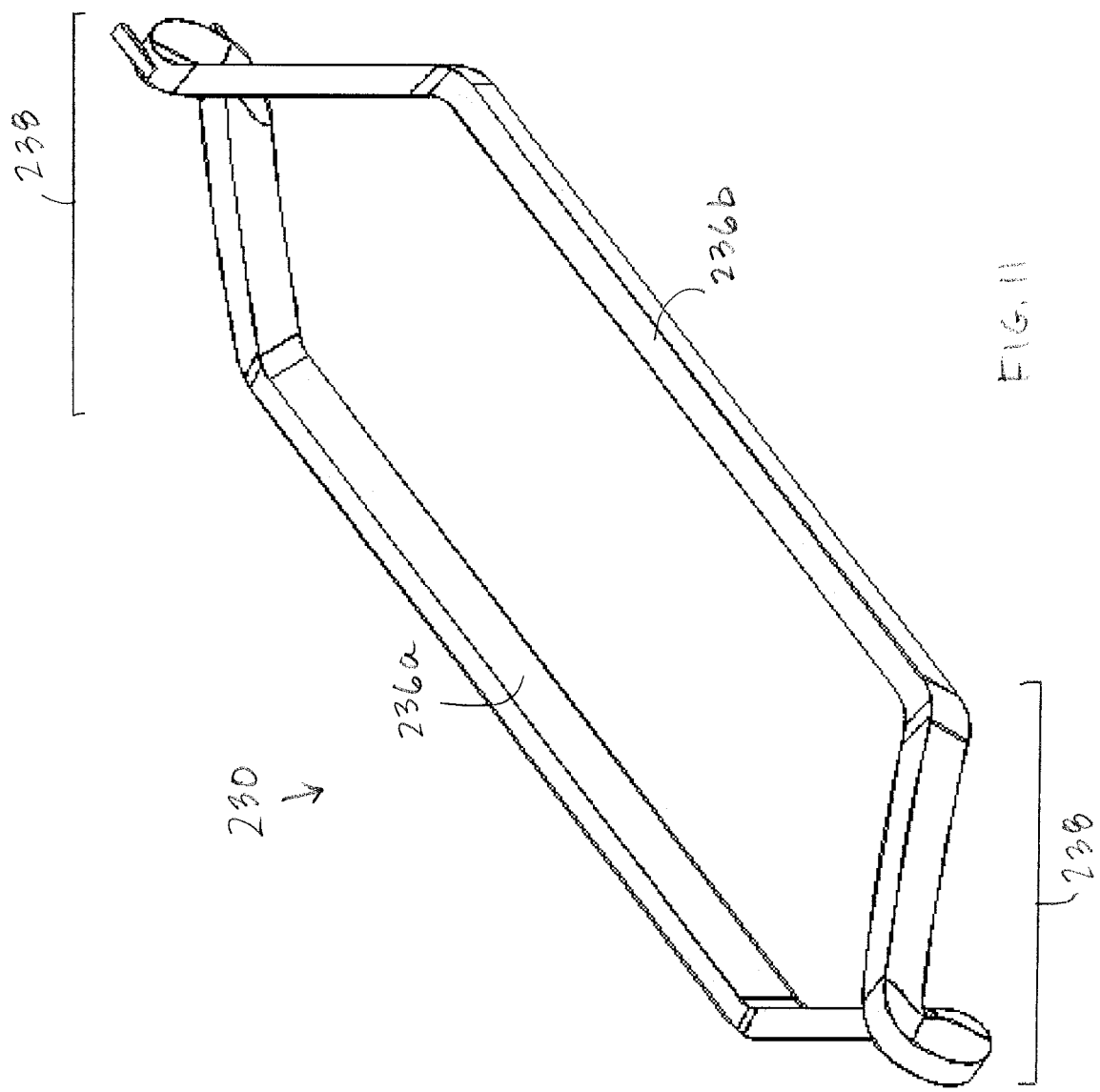
FIG. 11 is a perspective view of a diamond stator winding.
Figure 12:
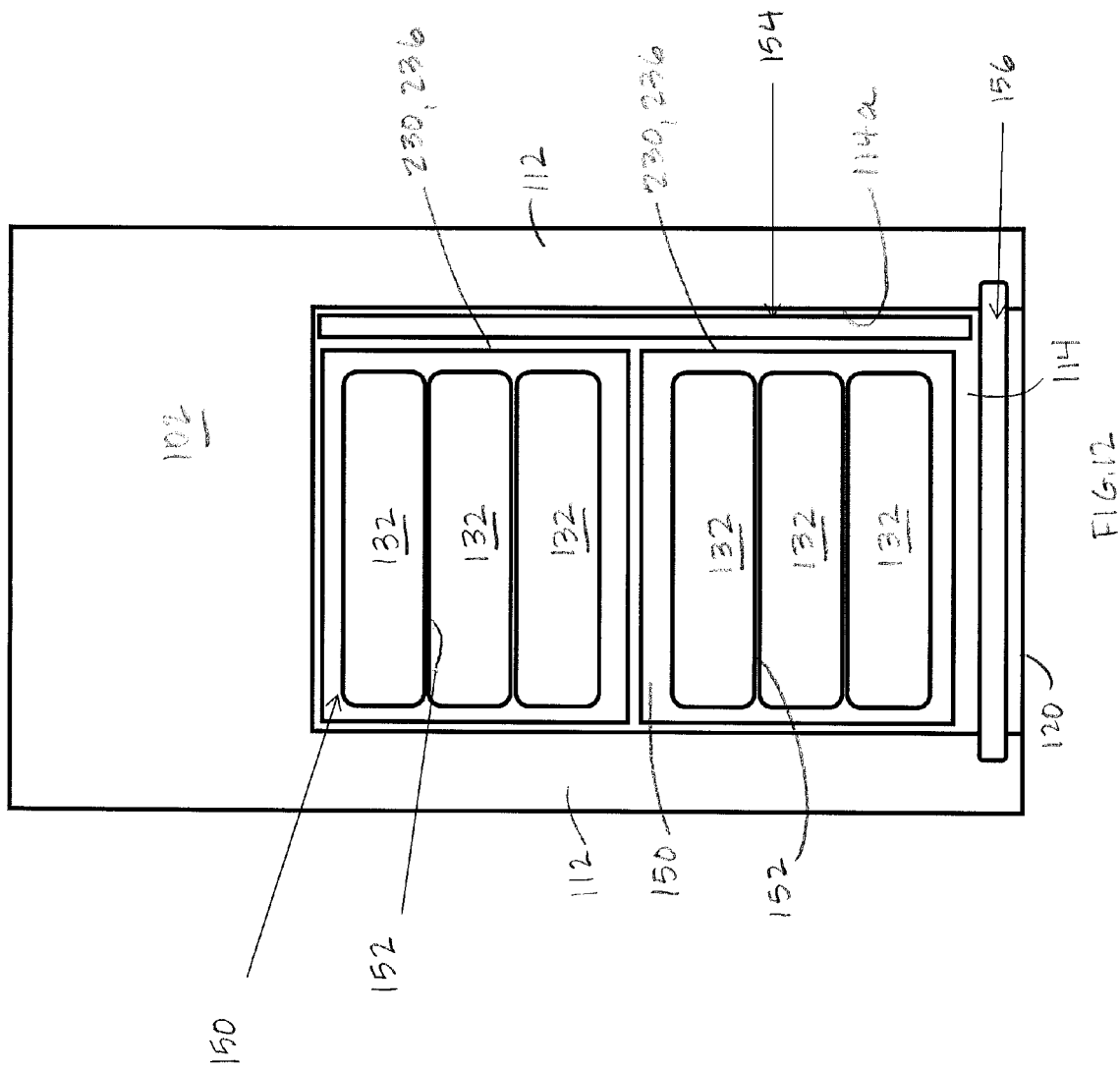
FIG. 12 is a partial sectional view of the stator core of the generator of FIG. 1 with diamond stator windings disposed in the slots.

Referring now to FIG. 11, a diamond winding 230 includes transposed cables 132 wound in a generally diamond shape. The diamond windings 230 are arranged within the stator slots 114 by overlapping straight portions 236 of adjoining windings in the same phase, whereby each slot 114 receives two windings 230. In particular, one straight portion 236a occupies the radially inward location of one slot 114, and the other straight portion 236b occupies the radially outward location of another slot 114. Standard diamond windings have an end geometry that makes it difficult to achieve a greater slot fill than about 50 percent. As seen in FIG. 12, the cross-sectional area of the straight portion 236 is about half of the slot area $A_S$, and the straight portion 236 of the diamond winding 230 occupies about half of the slot 114. Due to the presence of ground insulation 150 on each diamond winding, a double layer of insulation is formed between the two windings 230 disposed in the slot 114, having the effect that the amount of conductor in the slot 114 when using a diamond winding 230 is less than when using a cranked winding 130.

Figure 13:
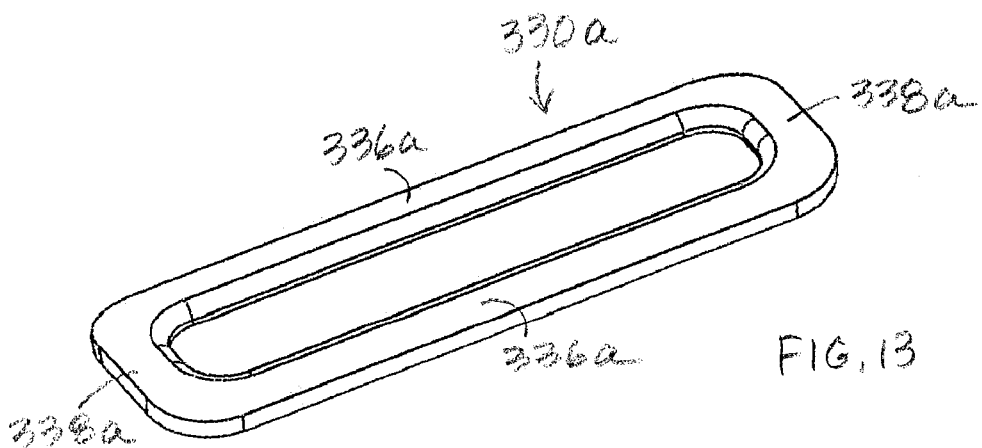
FIG. 13 is a perspective view of a flat stator winding portion of a single layer stator winding.
Figure 14:
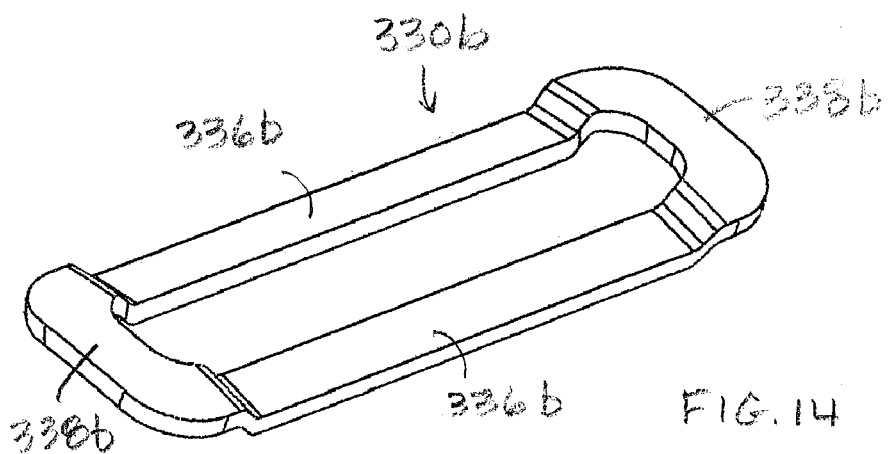
FIG. 14 is a perspective view of a upset-end winding portion of a single layer stator winding.
Figure 15:
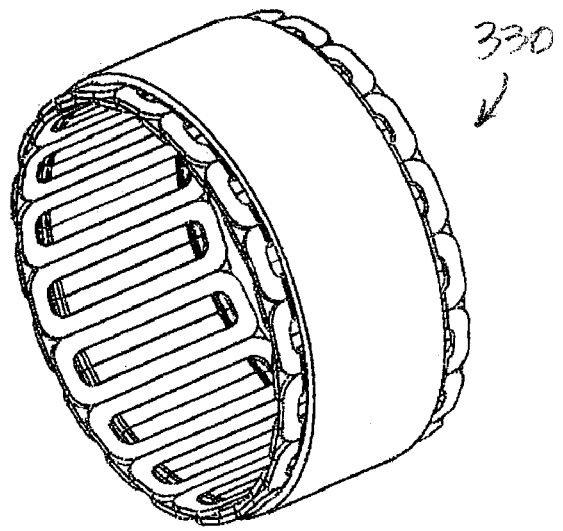
FIG. 15 is a perspective view of an assembly of multiple single layer stator windings.

Referring now to FIGS. 13-15, a single layer winding 330 includes a flat stator winding 330a (FIG. 13) used in combination with a upset-end stator winding 330b (FIG. 14). In the flat stator winding 330a, the end turn portion 338a is U-shaped and lies in the same plane as the straight portion 336a. In the upset-end stator winding 330b, the end turn portion 338b is U-shaped but extends upward from the plane defined by the straight portions 336b. When assembled together (FIG. 15), the straight portion 336b of the upset-end stator winding 330b resides between, and in the same plane as, the straight portions 336a of the flat stator winding 330a. In addition, the end turn portion 338b of the upset-end stator winding lies parallel to, and partially overlies, the end turn portion 338a of the flat stator winding 330a. Like the cranked winding 130, the cross-sectional area of the straight portion 336a, 336b is substantially the same as the slot area $A_S$, and the single layer winding 330 substantially fully occupies the slot 114. In addition, the single layer winding has a better conductor packing factor than the cranked winding 130 due to differing insulation requirements. However, the single layer coil 330 may be more difficult to install and support than the single layer winding 130.

A selected illustrative embodiment of the stator assembly 100 for use in the generator 10 is described above in some detail. However, the stator assembly as described herein is not limited to use in a generator. For example, the stator assembly can be used in other types of rotating electrical machines, including high torque, low speed motors.

In addition, it should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. A synchronous rotating electrical machine comprising:
a rotor assembly including a rotor having high temperature superconducting rotor windings; and
a stator assembly, the stator assembly including a stator core formed of a ferromagnetic material and including a plurality of teeth defining slots, the slots configured to receive and support stator windings,
wherein
the ratio of the sum of the widths of the slots to the sum of the widths of the teeth and slots is in the range of 0.65 to 0.90, and
an air gap exists between the rotor assembly and the stator teeth that is greater than 20 mm.

2. The machine of claim 1, wherein the air gap is greater than 40 mm.

3. The machine of claim 1, wherein the radially innermost edges of the teeth jointly define a bore of the stator core, and the annular region between the bore and the rotor windings is free of ferromagnetic material.

4. The machine of claim 1, wherein the rotor assembly further includes a non-magnetic electromagnetic shield disposed between the rotor windings and the stator assembly.

5. The machine of claim 1, wherein the rotor and stator assemblies are configured to operate at frequencies up to 10 Hz.

6. The machine of claim 1, wherein the stator core is configured to have a tooth flux density during operation that is greater than 1.8 T.

7. The machine of claim 1, wherein the stator core is configured to have a tooth flux density during operation that is greater than 2.8 T.

8. The machine of claim 1, wherein the slots are elongate, radially extending openings formed in the stator core.

9. The machine of claim 1, wherein the teeth extend radially inward and are mutually circumferentially spaced apart.

10. The machine of claim 1, further comprising at least one stator winding disposed in a corresponding one of the slots; the stator winding including a coil formed of plural bundles of conductive wires.

11. The machine of claim 1, wherein the stator core includes an assembly of laminated plates.

12. The machine of claim 1, wherein the ratio of the sum of the widths of the slots to the sum of the widths of the teeth and slots is in the range of 0.70 to 0.90.

13. The machine of claim 1, wherein the ratio of the sum of the widths of the slots to the sum of the widths of the teeth and slots is in the range of 0.75 to 0.90.

14. The machine of claim 1, further comprising a stator winding including a straight portion, wherein the straight portion is disposed in one of the slots and the straight portion is configured to substantially fully occupy the slot.

15. The machine of claim 14, wherein the cross sectional area of the straight portion is substantially the same as the area of the slot.

16. The machine of claim 1, further comprising stator windings including a straight portions, wherein multiple stator winding straight portions are disposed in each slot.

17. The machine of claim 16 wherein the cross sectional area of a straight portion is substantially half the area of the slot, and two stator winding straight portions are disposed in each slot.

18. The stator assembly of claim 1, further comprising at least one stator winding including individual wire conductors arranged within the slot so that a radial conductor dimension is at least a factor of 1.5 larger than the circumferential conductor dimension.

19. The stator assembly of claim 1, further comprising at least one stator winding including individual wire conductors arranged within the slot so that a radial conductor dimension is at least a factor of 3 larger than the circumferential conductor dimension.

20. A wind turbine comprising:
a synchronous rotating electrical machine including:
a rotor assembly including a rotor having high temperature superconducting rotor windings; and
a stator assembly, the stator assembly including a stator core formed of a ferromagnetic material and including a plurality of teeth defining slots, the slots configured to receive and support stator windings,
wherein
the ratio of the sum of the widths of the slots to the sum of the widths of the teeth and slots is in the range of 0.65 to 0.90, and
an air gap exists between the rotor assembly and the stator teeth that is greater than 20 mm.

* * * * *